US005119544A

United States Patent [19]

Jackson

[11] Patent Number: 5,119,544

[45] Date of Patent: Jun. 9, 1992

[54] TOOL FOR SECURING A BOLT TO AN INSULATOR

[76] Inventor: James J. Jackson, 113 George St., Hutchinson, Kans. 67501

[21] Appl. No.: 642,828

[22] Filed: Dec. 17, 1990

[51] Int. Cl.[5] ........................ B23P 19/04; H01B 17/38

[52] U.S. Cl. ........................ 29/240; 174/165; 174/202; 81/13

[58] Field of Search ........................ 29/239, 240, 270; 81/121.1, 13, 55, 61; 174/165, 194, 202, 200, 203, 204, 205, 206

[56] References Cited

U.S. PATENT DOCUMENTS 2,600,214 6/1952 Davis ........................ 81/55
4,455,897 6/1989 Jones ........................ 81/61
4,704,779 11/1987 Lauritano ........................ 29/240

*Primary Examiner*—Bruce M. Kisliuk
*Assistant Examiner*—Eileen P. Morgan
*Attorney, Agent, or Firm*—John Wade Carpenter

[57] ABSTRACT

A tool for keeping an insulating member from turning comprising a base having a structure defining a recess for receiving and preventing an insulating member from turning when a bolt member is screwed into the insulating member; and an upright back secured to the base for supporting the base in a predetermined position. A method for securing a bolt to an insulator comprising inserting the insulator into the recess, and securing a bolt to the insulator while the insulator remains steadfastly in the recess.

12 Claims, 4 Drawing Sheets

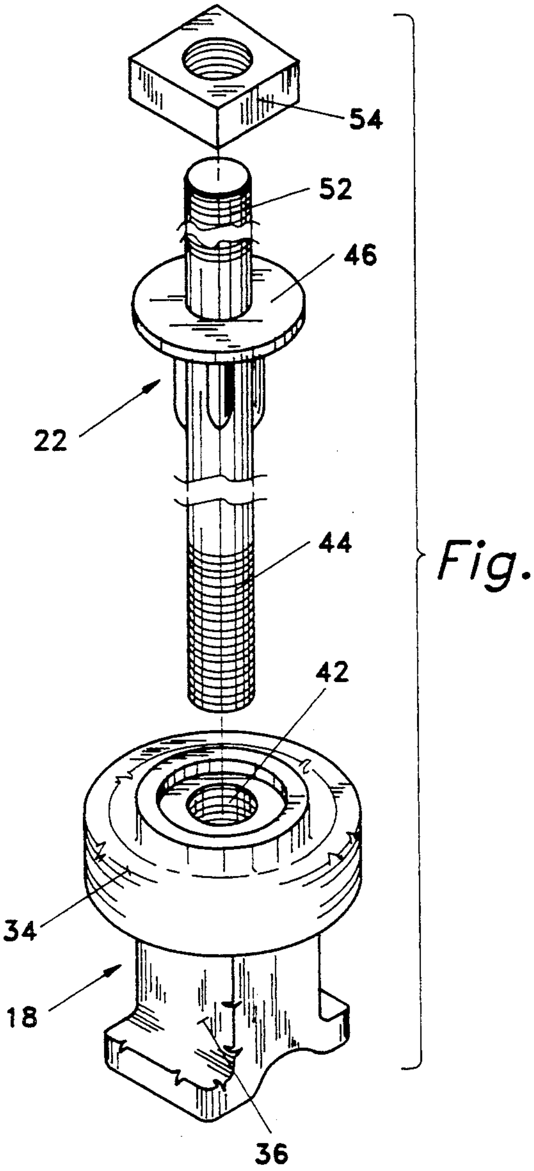
Fig. 4
Fig. 6
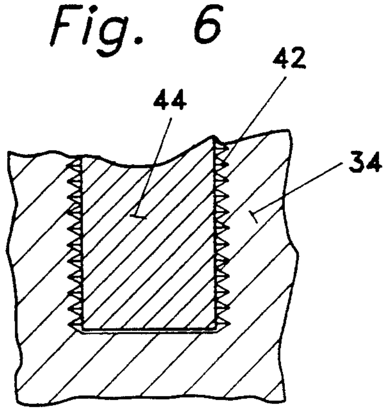
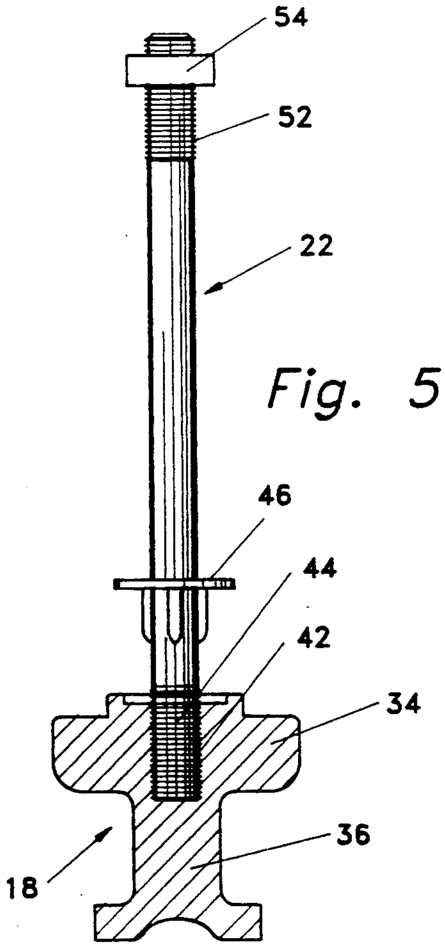
Fig. 5
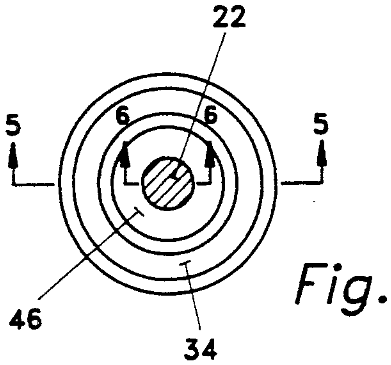
Fig. 4A

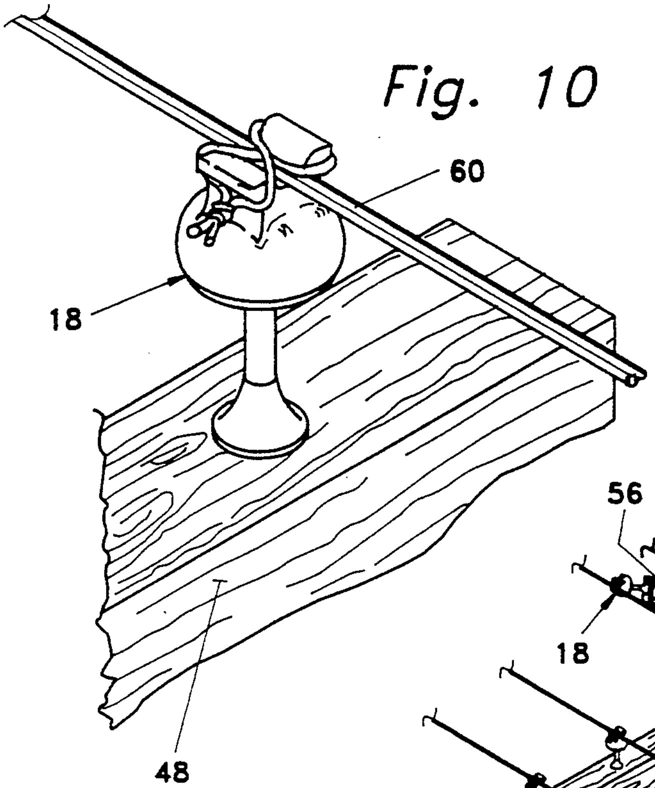
Fig. 10
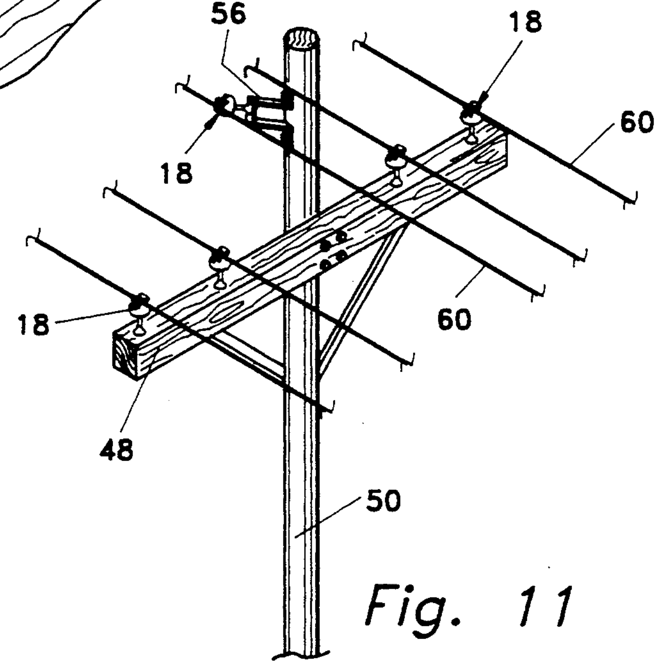
Fig. 11
Fig. 12
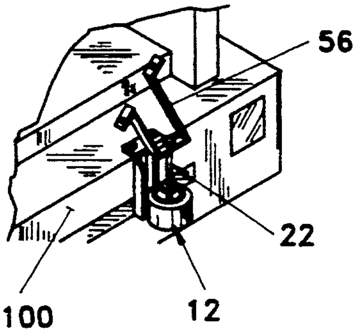
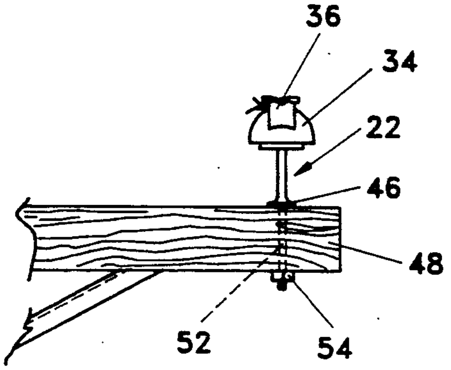
Fig. 13

TOOL FOR SECURING A BOLT TO AN INSULATOR

FIELD OF THE INVENTION

The invention relates to a tool for keeping an insulator from turning, especially when a bolt is being secured to the insulator. More particularly, the present invention provides a tool, a tool and insulator combination, and a method for securing a bolt to an insulator.

DESCRIPTION OF THE PRIOR ART

A patentability investigation was conducted and the following U. S. Patents were discovered: U.S. Pat. No. 1,811,211 to Peirce, Jr,; U.S. Pat. No. 1,990,667 to Peirce, Jr.; U.S. Pat. No. 3,336,023 to Locatelli; and U.S. Pat. No. 3,838,490 to Willem. None of the foregoing prior art specifically teaches the tool and method of the present invention.

SUMMARY OF THE INVENTION

The present invention accomplishes its desired objects by broadly providing a tool for keeping an insulation member from turning comprising a base having a structure defining a recess means for receiving and preventing an insulation member from turning when a bolt member is screwed into the insulation member; and an upright back means secured to the base for supporting the base in a predetermined position. An insulator is configured geometrically to or as the recess means, and the insulator is inserted into the recess means.

The present invention further accomplishes its desired objects by providing a method for securing a bolt to an insulator comprising the steps of:

(a) providing a tool having a base with a structure defining a recess means for preventing an insulator from turning when a bolt is being secured into the insulator member;

(b) providing an insulator generally configured geometrically as the recess means such that when the insulator is inserted into the recess means the insulator is incapable of revolving;

(c) inserting said insulator into said recess means;

(d) securing a bolt to the insulator.

It is therefore an object of the present invention to provide a tool for keeping an insulator from turning while a bolt is being secured to the insulator.

It is another object of the present invention to provide a method for securing a bolt to an insulator.

These, together with the various ancillary objects and features which will become apparent to those skilled in the art as the following description proceeds, are attained by this novel tool and process, a preferred embodiment being shown with reference to the accompanying drawings, by way of example only wherein:

BRIEF DESCRIPTION OF THE DRAWINGS

FIG. 4 is a disassembled view of an insulator and stud bolt;

FIG. 4A is a top plan view of the stud bolt assembled to an insulator;

FIG. 5 is a vertical sectional view taken in direction of the arrows and along the plane of line 5—5 in FIG. 4A;

FIG. 6 is a vertical sectional view taken in direction of the arrows and along the plane of line 6—6 in FIG. 4A;

FIG. 7 is a perspective view of the tool mounted to the rear of a pick-up truck or the like;

FIG. 10 is a perspective view of the insulator body after having been assembled in the tool, and mounted to a cross member of a telephone or electricity pole;

FIG. 11 is a perspective view of an assembled insulator and bracket member secured to an electrical pole;

FIG. 12 is a pespective view of an insulator and bolt assembly slidably engaged to the tool and having a bracket connected to the bolt, and FIG. 13 is a side elevational view of an insulator engaged to a stud bolt with the stud bolt connected to a cross-member of an electrical pole.

DETAILED DESCRIPTION OF THE INVENTION

Figure 1:
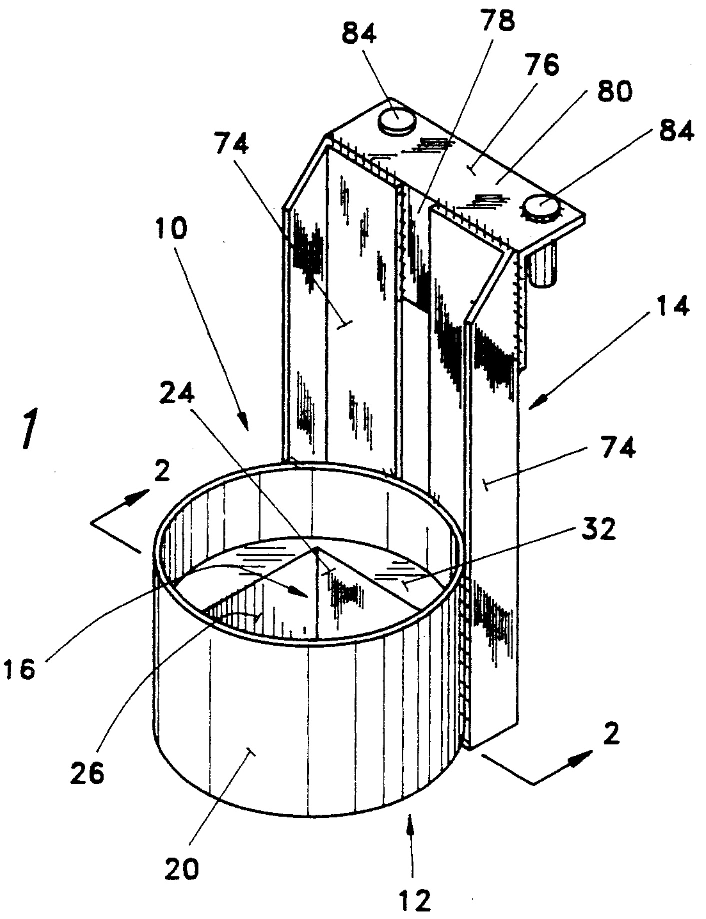
FIG. 1 is a perspective view of the tool.
Figure 2:
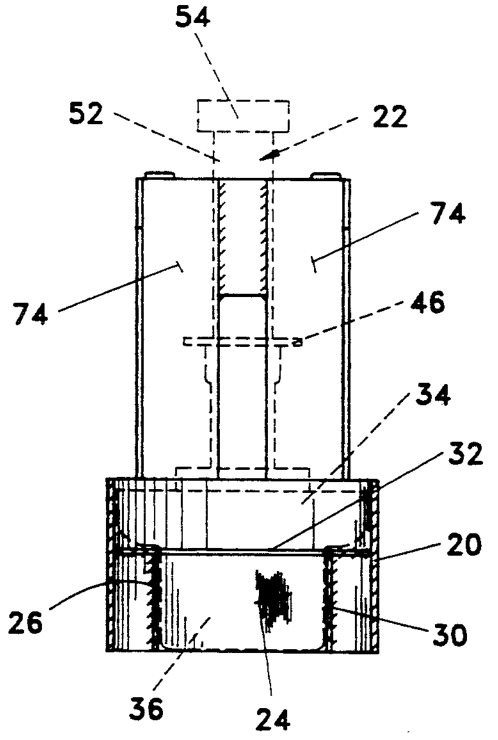
FIG. 2 is a front elevational vertical sectional view of the tool taken in direction of the arrows and along the plane of line 2—2 in FIG. 1.
Figure 3:
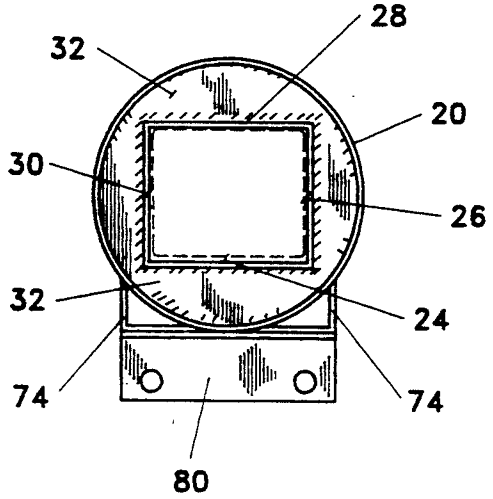
FIG. 3 is a top plan view of the tool.
Figure 7:
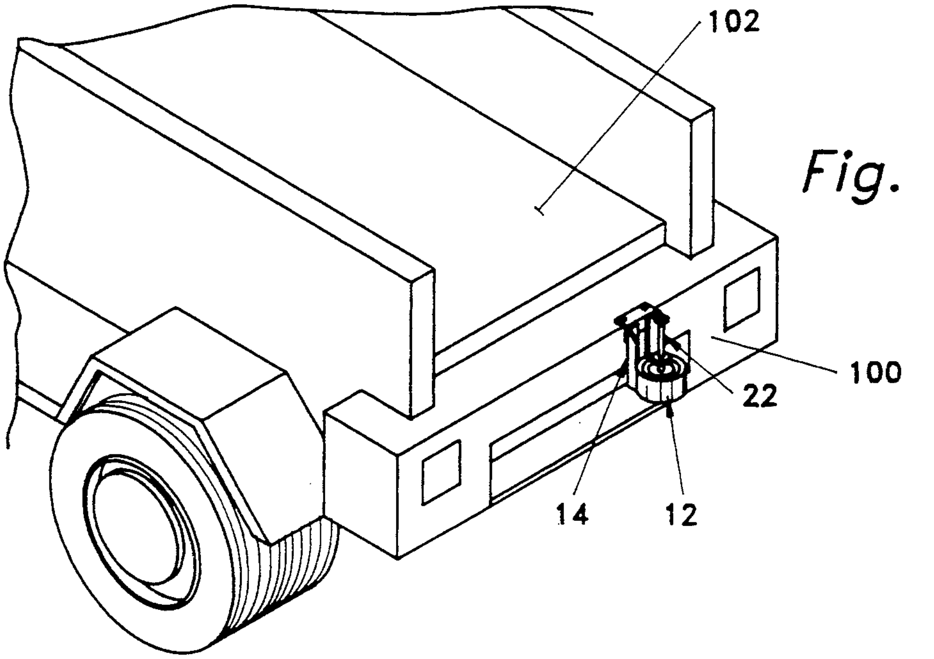
Figure 8:
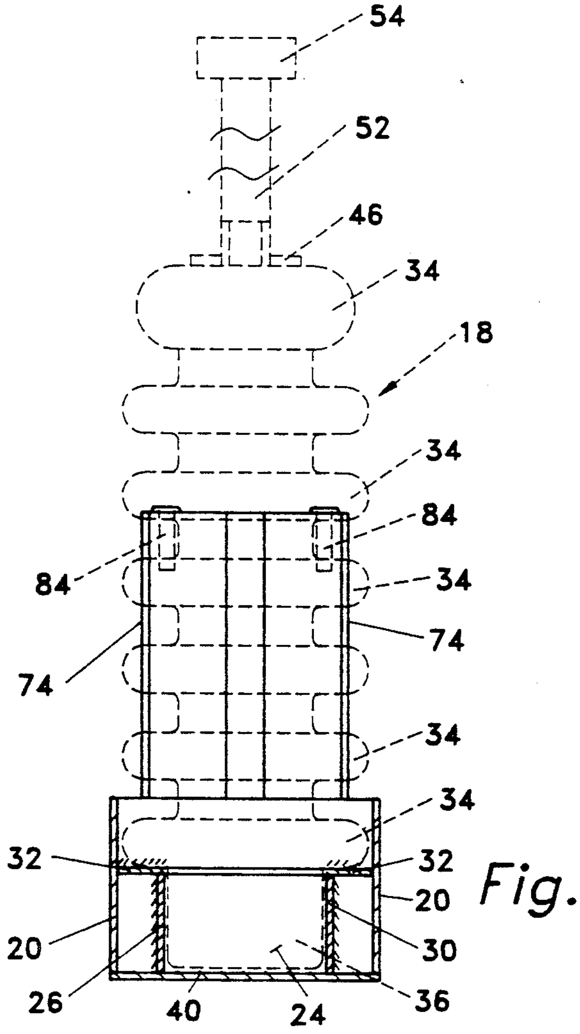
FIG. 8 is a perspective view of a vertical sectional view of the tool with the insulator being depicted in dotted line configuration.
Figure 9:
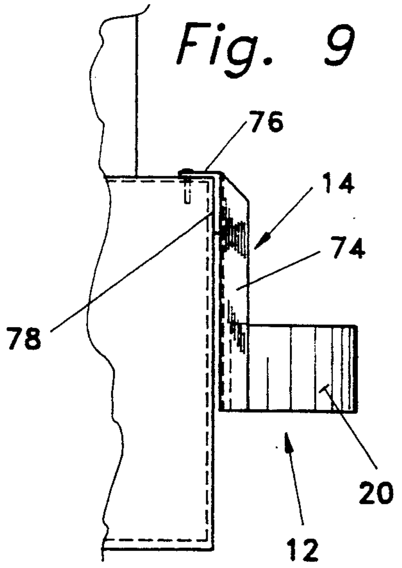
FIG. 9 is a side elevational of the tool mounted to the rear of the truck.

Referring in detail now to the drawings wherein similar parts of the invention are identified by like reference numerals, there is seen a tool, generally illustrated as 10, having a base, generally illustrated as 12, and an upright back, generally illustrated as 14. The base 12 has a recess, generally illustrated as 16, for receiving an insulator, generally illustrated as 18 (see FIG. 4). The base 12 may be of any geometric configuration but is preferably cylindrical having an upstanding cylindrical wall 20. The recess 16 is formed within the cylindrical wall 20 of the base 12 and may be of any geometric configuration but is preferably of a geometric configuration that can snugly receive the insulator 18 to prevent same from rotating or revolving when a stud bolt, generally illustrated as 22, is being connected to the insulator 18. Preferably, as best shown in FIGS. 1-3 the recess 16 has a box-like configuration having four walls 24, 26, 28 and 30. Any two contiguous walls (i.e. walls 24 and 26; walls 26 and 28; walls 28 and 30; and walls 30 and 24) are generally normal with respect to each other. Circumscribing or surrounding the recess 16 is boundary platform or shelf 32 which integrally connects to the top of the four walls 24, 26, 28, and 30, and to the inside of the cylindrical wall 20. The shelf or platform 32 functions to receive and support a flange 34 of the insulator 18 while a base 36 of the insulator 18 removably, snugly lodges within the four walls 24, 26, 28 and 30. As best shown in FIGS. 2 and 4, the base 36 is geometrically configured to snugly pass into and between the four walls 24, 26, 28, and 30 of the recess 16 such that the insulator 18 (including the flange 34 and base 36) will not turn or revolve when the bolt 22 is threadably engaging the insulator 18, more particularly the flange 34 of the insulator 18. While the base 36 of the insulator 36 resides snugly in a non-revolving fashion within the recess 16 (i.e. within the confines of the four walls 24, 26, 28 and 30), the flange 34 rest on and is supported by the shelf or boundary platform 32 as shown in the dotted line configuration in FIGS. 2 and 8. Optionally, a bottom or floor 40 (see FIG. 8) may be connected to the bottom of the four walls 24, 26, 28 and 30 and the cylindrical wall 20 to enclose the bottom of all of the same (including the recess 16 in general).

As previously indicated, the insulator 18 has a flange 34; and the flange 34 has a threaded bore 42 which is for rotatably receiving a threaded end 44 of the bolt 22. As best shown in a dotted line representation in FIG. 8, the flange 34 maybe a plurality of flanges 34 which are either integral, or may be slid around bolt 22 piece meal or individually and then followed by the mounting of a flange 46 to the bolt 22. The bolt 22 may be further provided integrally with the flange 46 that typically operationally rests on a cross member 48 that secures to a pole 50 as best shown in FIGS. 11 and 13. The flange 46 supports the insulator 18 in an upright posture while a remaining threaded end shank 52 of the bolt 22 passes through the cross-member 48 and engages a nut 54 (see FIG. 13) on the end thereof. In another embodiment of the invention, after the bolt 22 has threadedly secured to the insulator 18 (more particularly to the threaded bore 42 of the insulator 18), a bracket 56 is threadably engaged to the threaded shank end 54 (as best shown in FIG. 12) to mount the insulator 18 to the pole 50 (see FIG. 11) or the cross-member 48. While the bracket 56 is threadably engaging the bolt 22, the recess 16 within the base 12 prevents the lodged insulator 18 (more particularly the base 36 and the flange 34) from turning. The insulator 18 operationally functions to receive and retain wires, lines (or the like) 60 in an elevated posture, especially off the cross-member 48.

The upright back 14 maybe any suitable upright back capable of holding the base 12 in an upright posture, preferably generally parallel to a grid or the ground, and further capable of mounting to a support member, such as by way of example only the rear end 100 of a truck 102. In a preferred embodiment of the invention, the upright back 14, comprises a pair of opposed, spaced generally L-shaped rail members 74—74 which connect to the base 12, more specifically to the cylindrical wall 20. A generally L-shaped bracket 76 is provided as having a back 78 and a flanged face 80 connecting generally normal to the back 78. A pair of bolts 84 pass through the face 80 to secure the upright back 14 to the rear end 100 of the truck 102, or any other structure.

With continuing reference to the drawings for operation of the invention and the method of assembling the bolt 22 to the insulator 18, the insulator 18 is slid or otherwise deposited into the recess 16 such that the base 36 is closely confined within the recess 16. The base 36 is steadfast within the base 36 and is not capable of revolving or turning. When the base 36 is in such a posture, the flange 34 rests upon and is supported by the shelf or boundary platform 32. The bolt 22 is subsequently rotated into the threaded bore 42; and during the rotating procedure the base 36 will not rotate, facilitating the coupling of the bolt 22 to the insulator 18. After the bolt 22 has been firmly secured to the insulator 18, the bolt 22/insulator 18 combination is removed from the tool 10 (more specifically from within the recess 16 of the base 12) and the bolt 22 is passed through the cross-member 48 such that the flange 46 supports the bolt 22/insulator 18 combination in an upright posture as best shown in FIG. 13. The nut 54 is conveniently threadably engaged to the threaded shank end 52 to affixed stationarily the bolt 22/insulator 18 combination to the cross-member 48. In the feature of the invention where the bracket 56 is employed, after the bolt 22 has been firmly secured to the insulator 18, the bracket 56 is threadably engaged to the threaded shank end 54. During this securing procedure, the base 36 of the insulator 18 (and the bolt 22) will not rotate and facilitates the securing of the bracket 56 to the bolt 22 and the coupling of the bracket 56 to the insulator 18. The bracket 56 may then subsequently be mounted to the pole 50 (or any other structure) to dispose the bolt 22/insulator 18 combination in a desired position. In the feature of the invention employing a plurality of insulating flanges 34, the flanges 34 are superimposedly aligned in a co-axial manner and the shaft of the bolt 22 is passed therethrough to threadably secure the bolt 22 to the threaded bore 42 of the lowermost flange 34. In this posture, the flange 46 of the bolt 22 rests against the uppermost flange 34. Alternatively, a bolt 22 without a flange 46 is initially threadably engaged to the bore 42 of the lowermost flange 46 and the remaining plurality of insulating flanges 34 may be passed over and/or along the bolt 22 to superimposedly rest on the lowermost flange 34. The bolt flange 46 may then be secured to the bolt 22 such that the bolt flange 46 rest against the uppermost flange 34. The entire combination may then be mounted to any structure, such as cross-member 48.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A tool for keeping an insulation member from turning comprising a base having a structure defining a recess means for receiving and preventing an insulation member from turning when a bolt member is screwed into the insulation member; and an upright back means secured to the base for supporting the base; said upright back means comprises at least one rail member secured to said base and a support bracket secured to said rail member.

2. A tool in combination with an insulator comprising a tool including a base with a structure defining a recess means configured geometrically for receiving and preventing an insulator from turning; an upright back means secured to the base for supporting the base; and an insulator configured geometrically as the recess means and, slidably disposed within the recess means such as to be incapable of revolving; said upright back means comprises at least one rail member secured to the base and a support bracket secured to said rail member.

3. The tool of claim 1 wherein said recess means comprises four interconnected walls with each wall having a top, a shelf member connected to the top of each wall.

4. The tool of claim 3 wherein said base comprises an upright cylindrical wall, said shelf member connects to an inside of said cylindrical wall.

5. The tool of claim 3 additionally comprising a floor member connected to the four walls and to the cylindrical wall.

6. The tool of claim 4 wherein said at least one rail member comprises a pair of spaced generally L-shaped rail members connected to the cylindrical wall, and said support bracket comprises a generally L-shaped support bracket connected to the pair of rails.

7. The tool combination of claim 2 wherein said recess means comprises four interconnected walls with each wall having a top, a shelf member connected to the top of each wall.

8. The tool combination of claim 7 wherein said base comprises an upright cylindrical wall, said shelf member connects to an inside of said cylindrical wall.

9. The tool combination of claim 7 additionally comprising a floor member connected to the four walls and to the cylindrical wall.

10. The tool combination of claim 8 wherein said at least one rail member comprises a pair of spaced generally L-shaped rail members connected to the cylindrical wall, and said support brackets comprises a generally L-shaped support bracket connected to the pair of rails.

11. The tool combination of claim 10 wherein said insulator comprises a base disposed within the confines of the four walls; and an insulating flange connected to the base and resting in contact on said shelf member.

12. The tool combination of claim 11 additionally comprising a bolt member engaged to said insulating flange, and a bolt flange integrally bound to the bolt.

* * * * *